United States Patent [19]
Arai

[11] 3,741,584
[45] June 26, 1973

[54] DEVICE FOR INFLATING A SAFETY BAG FOR VEHICLE PASSENGERS

[75] Inventor: Hiroshi Arai, Toyota, Japan

[73] Assignee: Toyota Jidosha Kogyo Kabushiki Kaisha, Aichi-ken, Japan

[22] Filed: Apr. 8, 1971

[21] Appl. No.: 132,274

[30] Foreign Application Priority Data
Dec. 1, 1970   Japan.............................. 45/105455

[52] U.S. Cl. .............. 280/150 AB, 137/51, 180/98, 180/103, 343/7 ED
[51] Int. Cl............................................. B60r 21/08
[58] Field of Search.................. 280/150 AB, 150 B; 180/98, 91, 103; 343/7 ED; 222/6; 137/39, 51

[56] References Cited
UNITED STATES PATENTS

| 3,617,073 | 11/1971 | Landsman | 280/150 AB |
| 3,420,572 | 1/1969 | Bisland | 343/7 ED X |
| 3,172,684 | 3/1965 | Isaac | 280/150 AB |
| 3,448,822 | 6/1969 | Lalone et al. | 180/98 |
| 3,495,675 | 2/1970 | Hass et al. | 180/103 X |
| 3,642,303 | 2/1972 | Irish et al. | 280/150 AB |
| 3,547,467 | 12/1970 | Pociask | 280/150 AB |

Primary Examiner—Leo Friaglia
Assistant Examiner—John P. Silverstrim
Attorney—John J. McGlew and Alfred E. Page

[57] ABSTRACT

A device for inflating a safety bag which forms a protective cushion in a vehicle for passengers includes a compressed air source which is connected to the protective air bag through two separate connecting lines. Each line is controlled by a valve which is operated either by a collision-sensing or crash detector. One of the detectors is set to operate the valve at a first condition in which a collision is sensed and it provides an inflation of a bag at a predetermined rate which is less than the passage flow rate through the second valve controlled passage. The second valve is controlled by a separate detector which is set to operate at a higher value or at a distinct collision-sensing condition, for example, at the condition of actual impact, or after a predetermined first collision condition has been achieved. The collision conditions are measured, for example, by accelerometers. The arrangement is such that both flow passages, or at least one flow passage, will provide for an air connection to the bag to provide rapid inflation of the bag to protect the passenger as necessary.

5 Claims, 3 Drawing Figures

INVENTOR
HIROSHI ARAI
BY
McGlew & Tuttle

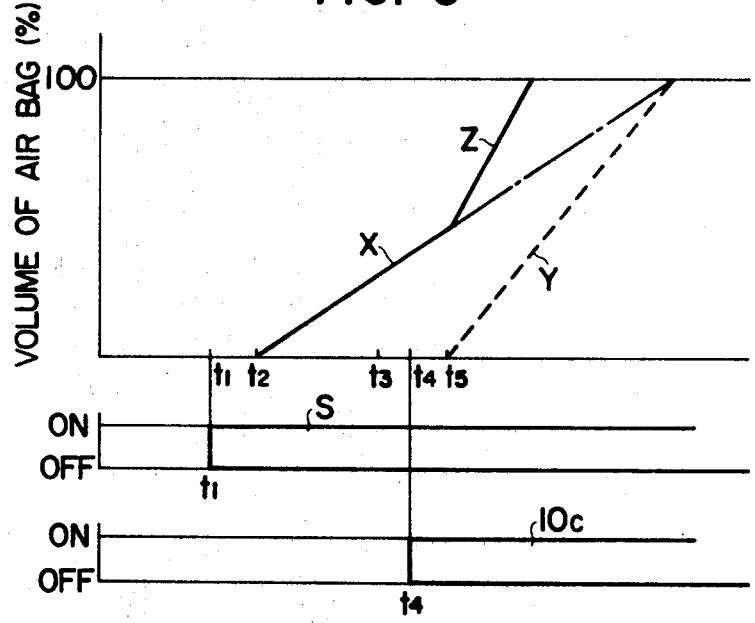

DEVICE FOR INFLATING A SAFETY BAG FOR VEHICLE PASSENGERS

SUMMARY OF THE INVENTION

This invention relates in general to safety devices for protecting vehicle passengers and, in particular, to a new and useful device for inflating a protective air bag which forms a cushion for the passenger of a vehicle and which includes two separate means for sensing a collision condition and for inflating the bag.

Upon the occurrence of a collision, it is usual that a second crash will be caused due to the impact force which results from the primary crash of the vehicle with an obstacle. In order to protect passengers from injuries which would be likely to occur upon a collision, various safety devices have been proposed which are actuated by a signal which is generated when a collision condition is sensed in advance of the actual crash by deriving a control signal from the relative speed and the relative distance between the vehicle and an object in its path based on the Doppler effect on ultrasonic waves or ultrashort waves. This sensed condition is used to actuate a safety device to inflate, for example, an inflatable bag cushion to protect the passengers against impact. The sensor equipment include devices which radiate ultrasonic waves of light to an object in a vehicle path and receive reflected waves back. In this manner the device is set to calculate the expected time of crash in accordance with the relative speed and the relative distance between the vehicle and the object, and, in accordance with the condition sensed, to issue collision-sensing control signals to operate a valve mechanism for regulating the flow of compressed air to the protective air bag.

The sensor devices require a high degree of accuracy for satisfactory operation but the instruments required for this sensing are thrown out of calibration when they are carried in a vehicle which is subject to vibration, such as an automobile. There is thus the possibility that the safety device will not operate desirably and that the passengers will be seriously injured in an accident. Some means for compensating for the possibility that the device will not operate satisfactorily must be provided. In addition, the safety sensing equipment must be able to detect a collision in advance of the occurrence of an actual crush so that the devices are able to foretell the magnitude of the impact force which will result from the actual collision. The sensing equipment for actuating the inflating devices for the protective bag is such that even though the impact force of the resultant collision will be relatively minor, so that very little danger to the passengers is present, there will nevertheless be a rapid inflation of the protective bag which will cause an obstruction of the driver's view and a restriction of the operational capabilities of the driver.

In accordance with the present invention, there is provided a safety device of improved reliability which is capable of satisfying various safety requirements in all types of collision possibilities. For this purpose, there is provided at least two collision condition sensors which detect collision conditions of distinct values and which control the operation of separate flow passages from a compressed air source to a protective air bag. The separate connecting passages between the compressed air and the protective bag are preferably made of different sizes in order to provide more rapid flow in one than in the other. The arrangement is such that the air bag is inflated irrespective of the operation of each individual safety device, thus guaranteeing that there will be at least one safety device which is operative to inflate the protective bag to safeguard the passengers during an impending collision or during the collision and directly after it.

Accordingly, it is an object of the invention to provide an improved device for effecting the inflation of a protective air bag in a vehicle to act as a protective cushion for passengers and which includes two separate detector means for sensing various collision or impending collision conditions and wherein each of the sensor means are connected to separate solenoid valves for the control of air flow through separate passages from a compressed air supply to the protective air bag.

A further object of the invention is to provide a protective air bag inflation device which includes a compressed air container and to a second passage to a compressed air container, each passage including a solenoid valve, first detection means connected to the first solenoid valve of the first passage and second detection means connected to the solenoid valve of the second passage, said first and second detection means being set at different values, for example, by the action of an accelerometer and/or by transmitter-receiver means in order to open the valves in respective passages to permit the flow of compressed air to inflate the protective air bag; and wherein the first and second passages are of a different size in order to provide different rates of air flow.

A further object of the invention is to provide a protective bag inflation system which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

BRIEF DESCRIPTION OF THE DRAWING

In the Drawing:

FIG. 3 is a graphic illustration showing the inflation rates for various collision conditions.

GENERAL DESCRIPTION OF THE PREFERRED EMBODIMENT

Figure 1:
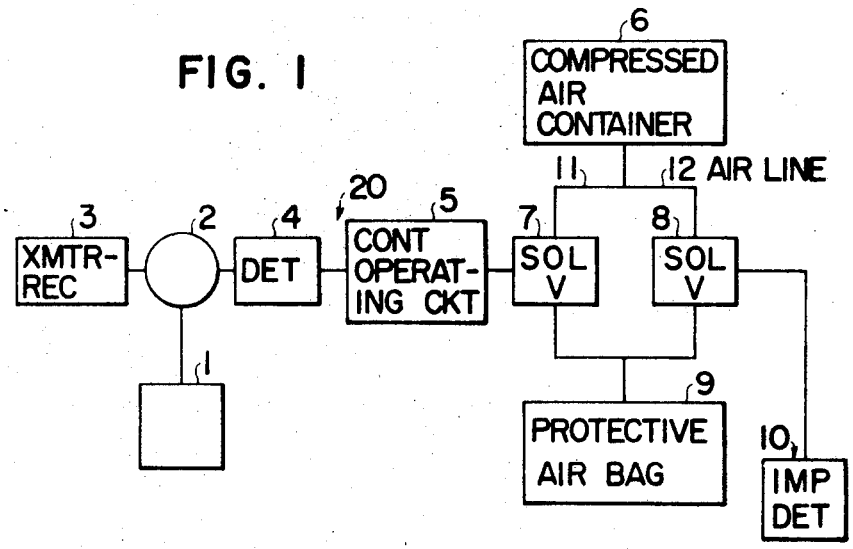
FIG. 1 is a schematic view of a protective air bag inflation device constructed in accordance with the invention.

Referring to the drawing in particular, the invention embodied therein comprises, a protective air bag inflation device which includes first detector means generally designated 20 for detecting a first collision condition or impending collision condition of a vehicle and second detection means 10 for detecting a second collision or impact condition.

In accordance with the invention, the first detection means 20 and the second detection means 10 are connected to respective solenoid valves 7 and 8 in respective first and second air flow passages 11 and 12, which in turn, are connected between a compressed air container 6 and a protective air bag 9. When the valves 7 and 8 are open, the compressed air will flow from the container 6 into the protective air bag 9 and inflate it to form it into a protective cushion for protecting a passenger in a vehicle.

As shown in FIG. 1, the first detection means 20 includes a radio signal oscillator 1 which is connected by a directional coupler 2 to a transmitting receiving means 3. The transmitting receiving means 3 is aimed to detect objects in front of the vehicle and oriented in the direction of travel to give an indication of a rapid closing movement of the vehicle in respect to the object such as would occur on the occasion of a collision. The coupler 2 is connected to a detector 4. Radio signals from the oscillator 1 are radiated with appropriate directivity and radiant energy through the transmitting receiving means 3. If there is any object within the predetermined region, the radio wave reflected from the object is received by the transmitting receiving means 3.

In the detector 4, a Doppler signal equivalent to the difference in frequency between the part of the radiated wave of the oscillator 1 in the reflected wave is obtained. The detector 4 is connected to a control operating circuit 5 which is set to send out a control pulse to actuate the solenoid 7 after the electrical pulse from the Doppler signals reaches a predetermined value. In the control 5, the product of the two signal quantities, figured over the remaining time are determined. When the product of the two quantitites exceeds a predetermined value, a collision sensing signal is issued which actuates the solenoid 7.

Figure 2:
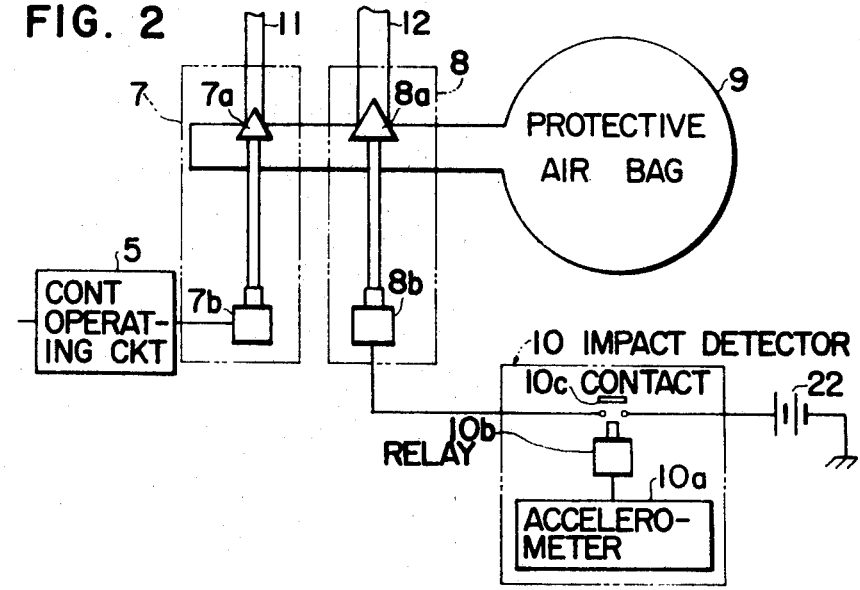
FIG. 2 is an enlarged circuit diagram illustrating a portion of the mechanism indicated in FIG. 1.

As shown in FIG. 2, the solenoid 7 is connected in the first air passage means 11 and it includes a valve element 7a which shuts off the passage when the valve is in a nonactuated position. When this valve is moved by the actuation of the solenoid coil 7b, it opens the first passage 11 to establish communication between the air compressor 6 and the protective bag 9 and thus causes the inflation of the bag.

In accordance with a further feature of the invention, a second detector 10 detects the impact force resulting from the vehicle crash. It comprises a sensor and actuator for a solenoid valve 8 which includes a valve member 8a which closes a relatively large size passage 12 which is larger than the passage 11. When the solenoid coil 8b is actuated, such as when the impact detector 10 is activated, then flow through the much larger passage 12 from the air compressor 6 to the protective air bag 9 is effected.

The impact detector 10 which detects the impact force resulting from a vehicle crash comprises an accelerometer 10a which detects the impact resulting from the occurrence of a collision, and a relay contact 10c which is interposed between the solenoid 8b of the solenoid valve 8 and a power source 22. The accelerometer actuates a relay 10b to switch on the relay contact 10c when the accelerometer detects an impact force of greater than a predetermined magnitude. Thus only when the impact force resulting from a vehicle crash produces a detection signal beyond a predetermined magnitude, then the valve member 8a will be actuated to open the large size passage 12 to provide for the rapid inflation of the protective air bag 9. This impact detection means 10 will operate independently of the other detector 20 and will always operate, for example, in the case of an actual collision and crash.

The operation of the device is as follows:

When the detector device 20 detects a collision and issues a collision sensing signal at a time $t_1$ as shown in the graph of FIG. 3, the valve member 7a of the solenoid valve 7 is opened by the solenoid 7b to open the line 11. The compressed air is supplied from the compressed air container to the air bag 9 to start the inflation thereof. It takes a small period of time until the inflation of the air bag 9 is initiated. The air bag starts to inflate at the time $t_2$ in a substantially proportionated relationship as indicated by the straight line denoted by the letter X. When the vehicle strikes against an obstacle in its path at the time $t_3$, the inflation of the air bag still continues and the accelerometer 10a of the impact detector 10 is actuated by the magnitude of the impact force. If this impact force is greater than the predetermined value set on the device, the relay contact 10c will be switched on by the relay 10 $d$ at the time $t_4$. Upon reception of the signal, the valve member 8a of the solenoid valve 8 is opened at the time $t_5$ after some delay in the action. This causes the opening of the line 12 which is of a larger diameter than the line 11 so that the inflation rate will be greater. The inflation of the bag will progress along the line indicated by the straight line Y in FIG. 3. This means that at the time $t_5$, the inflation of the air bag 9 is performed at least by the second detection means 10 but in most instances by both the detection means 20 and the detection means 10 acting concurrently to open the valves 8 and 7 for the combined flows through the lines 12 and 11. Once the line 12 is cut into the air supply, the rate of air supply is greatly increased and, therefore, the air bag is inflated as indicated by the straight line Z. Its inflation is completed well in advance of the occurrence of a secondary crash of the vehicle in which the vehicle passengers are struck against the part of the vehicle body and it thus protects the passengers safely.

In the event that the detector means 20 fails to operate properly and does not issue any collision sensing signal wen one should be issued, there will nevertheless be an inflation of the protective air bag 9 solely by the action of the impact detector 10. In this case, the air bag 9 is inflated at a rate indicated by the straight line Y and solely through the connecting line 12. Although the completion of the inflation is somewhat delayed compared with the inflation when both devices are operating, the inflation of the air bag will be completed before the passengers are thrown against the interior of the vehicle and thus will protect the passengers safely.

In the event that the impact detector 10 does not operate satisfactorily, then the air bag 9 will be inflated as indicated by the straight line X solely by the action of the solenoid valve 7 but this will still protect the passengers safely.

The safety detection system generally designated 20 is operated on the basis of the following principle:

When a signal having the frequency $f_1$ is radiated from a vehicle, a signal having the Doppler-shifted frequency $f_2$ is reflected from an object in the path of the vehicle. The relation between these frequencies may be expressed by the following equation in which the relative speed is $v$ and the signal propagation speed is $c$:

$$f_2 \approx c + v/c - v f_1$$

From this equation, the difference frequency $f_d$ between the frequencies $f_1$ and $f_2$, hereinafter referred to as Doppler signal frequency, may be determined as follows:

$$f_d = f_2 - f_1 \approx 2f_1/c \, v = k_1 v$$

In this equation, $k_1$ is a proportionality constant.

Since the frequency $f_1$ of the radiated signal and the propagation speed $c$ are known in advance, the frequency $f_d$ of the Doppler signal can be obtained as a value proportional to the relative speed $v$ between the vehicle and an object in its path.

The level of the Doppler signal is inversely proportional to the distance between the vehicle and an object in its path, in the smallest distance wherein the safety device of the invention is to be actuated, so that the relation between the level G of the Doppler signal and the relative distance D can be expressed as follows:

$$G = k_2/D$$

In this equation $k_2$ is a proportionality constant. Then, the product S of the frequency $f_d$ of the Doppler signal and the level G thereof is obtained as follows:

$$F_d \times G = k_1 v \, k_2/D = k_1 k_2 v/D = k \, 1/T$$

In this equation, $T$ equals $D/v$, which indicates the time duration from the moment when a collision is sensed until the occurrence of the actual collision, provided that the vehicle will crash with the object at the relative speed $v$ which has been derived when the obstruction in the vehicle path has been detected. Consequently, when the remaining time $T$ is decreased to less than the specified value and when the product S exceeds the specified value, a collision is sensed and a predetermined signal is issued, thus actuating the safety device for vehicle passengers to protect the passengers.

The invention provides a safety device which uses both a sensor for detecting impending collision and a sensor for detecting impact and each of these sensors operate independently to provide an inflation of an air bag by flow of the air through separate passages which are controlled by these separate sensors. The two sensors are set to compliment one another so that when one does not operate there would nevertheless be an inflation of the bag by the other and the inflation will occur over a time period which will be sufficient in each case to achieve the desired protection of the vehicle passengers. When the collision detector is operating satisfactorily, there will be an inflation of the bag in a time to avoid damage when the actual collision occurs, but when it is not operating properly, there will be little danger that there will be an inflation of the bag which will impede the driving of the vehicle. Because there is a second detector which operates on the impact of the vehicle, there will nevertheless be an adequate filling of the bag even though the collision sensing detector does not work.

While a specific embodiment of the invention has been shown and described in detail to illustrate the application of the principles of the invention, it will be understood that the invention may be embodied otherwise without departing from such principles.

What is claimed is:

1. A safety device for vehicles, comprising a compressed air source, a protective bag inflatable to provide a protective cushion for supporting a vehicle passenger in the event of a collision, first passage means connected between said air source and said bag, a first valve in said first passage means closing said passage means, first detection means including transmitter and receiver means for detecting the rate of close of an object with the vehicle and for generating a first signal when the rate exceeds a predetermined amount, said first valve being operated in response to said first signal to establish connection between said air source and said bag through said first passage means, second passage means connected between said air source and said bag, a second valve in said second passage means closing said second passage means, second detection means including an impact detector operable upon collision of the vehicle for generating a second signal, said second valve being operated in response to said second signal to establish connection between said air source and said bag through said second passage means.

2. A safety device for vehicles, according to claim 1, wherein said impact detector includes an accelerometer, a relay connected to said accelerometer and operable thereby to send an electrical current to operate said second valve.

3. A safety device for vehicles, according to claim 1, wherein said second passage means is of a size larger than said first passage means, said second detector means being an impact detector.

4. A safety device for vehicles, comprising a compressed air source, a protective air bag for protecting passengers, a first air line connected from said air source to said air bag, a second air line connected from said air source to said air bag, a solenoid valve in said first line, a solenoid valve in said second line, impending impact sensing means for detecting a rate of close of the vehicle with an object above a predetermined amount which would indicate an impending impact condition and being connected to said first solenoid valve to operate said first solenoid valve to permit air flow through said first passage means to said bag upon sensing an impending impact condition, and impact sensing means connected to said second solenoid valve for generating a current to operate said second solenoid valve to open said passage when said vehicle is subjected to impact.

5. A safety device for vehicles, according to claim 4, wherein said second passage is of a greater size than said first passage so that the inflation rate is greater through said second passage than through said first passage.

* * * * *